US010128882B2

(12) United States Patent
Clevorn et al.

(10) Patent No.: US 10,128,882 B2
(45) Date of Patent: Nov. 13, 2018

(54) MOBILE COMMUNICATION RADIO RECEIVER FOR PROCESSING SIGNALS FROM MULTIPLE NETWORKS

(71) Applicant: Intel Deutschland GmbH, Neubiberg (DE)

(72) Inventors: Thorsten Clevorn, Duesseldorf (DE); Herbert Dawid, Aachen (DE); Bertram Gunzelmann, Koenigsbrunn (DE)

(73) Assignee: Intel Deutschland GmbH, Neubiberg (DE)

( * ) Notice: Subject to any disclaimer, the term of this patent is extended or adjusted under 35 U.S.C. 154(b) by 0 days.

(21) Appl. No.: 15/655,143

(22) Filed: Jul. 20, 2017

(65) Prior Publication Data

US 2018/0006674 A1    Jan. 4, 2018

Related U.S. Application Data

(60) Continuation of application No. 14/083,553, filed on Nov. 19, 2013, now Pat. No. 9,735,819, which is a
(Continued)

(51) Int. Cl.
*H04M 1/00* (2006.01)
*H04B 1/16* (2006.01)
(Continued)

(52) U.S. Cl.
CPC .............. *H04B 1/16* (2013.01); *H04W 68/02* (2013.01); *H04W 88/06* (2013.01)

(58) Field of Classification Search
CPC ...................................... H04W 76/025–76/026
See application file for complete search history.

(56) References Cited

U.S. PATENT DOCUMENTS 7,047,025 B2    5/2006    Jung
2003/0008691 A1    1/2003    Chen et al.
(Continued)

FOREIGN PATENT DOCUMENTS

WO    2012/055434 A1    5/2013

OTHER PUBLICATIONS

Non-Final Office Action dated Dec. 7, 2011 for U.S. Appl. No. 13/105,069.
(Continued)

*Primary Examiner* — Keith Fang
(74) *Attorney, Agent, or Firm* — Eschweiler & Potashnik, LLC (57) ABSTRACT

A mobile communications radio receiver for multiple radio network operation includes an RF unit for generating a first down-converted signal from a radio signal received from a first radio network and a second down-converted signal from a radio signal received from a second radio network. Further, it includes a first receiver comprising a paging indicator channel demodulator for demodulating a paging indicator channel of the first radio network based on the first down-converted signal, and a second receiver including a pilot channel demodulator for demodulating a pilot channel of the second radio network based on the second down-converted signal. A first data connection is configured to couple paging information contained in the second down-converted signal to an input of the paging indicator channel demodulator of the first receiver.

18 Claims, 9 Drawing Sheets

Related U.S. Application Data division of application No. 13/105,069, filed on May 11, 2011, now Pat. No. 8,611,952.

(51) Int. Cl.
*H04W 68/02* (2009.01)
*H04W 88/06* (2009.01)

(56) References Cited

U.S. PATENT DOCUMENTS

| | | |
|---|---|---|
| 2004/0042531 A1 | 3/2004 | Arikan et al. |
| 2005/0007977 A1 | 1/2005 | Jou |
| 2006/0215609 A1 | 9/2006 | Kyung et al. |
| 2006/0268789 A1 | 11/2006 | Yu et al. |
| 2007/0243832 A1 | 10/2007 | Park et al. |
| 2009/0213827 A1 | 8/2009 | Bitran et al. |
| 2009/0219861 A1 | 9/2009 | Higuchi et al. |
| 2009/0257487 A1 | 10/2009 | Wang et al. |
| 2010/0041360 A1* | 2/2010 | Camp, Jr. ............... H04B 1/30 455/318 |
| 2010/0210321 A1 | 8/2010 | Tu et al. |
| 2010/0267410 A1 | 10/2010 | Chin et al. |
| 2010/0331019 A1* | 12/2010 | Bhattacharjee ... H04W 52/0229 455/458 |
| 2011/0149947 A1 | 6/2011 | Kim et al. |
| 2012/0172011 A1* | 7/2012 | Gupta .................. H04W 68/02 455/414.1 |
| 2012/0264473 A1 | 10/2012 | Mujtaba et al. |

OTHER PUBLICATIONS

Final Office Action dated Apr. 1 2012 for U.S. Appl. No. 13/105,069.
Notice of Allowance dated Aug. 19, 2013 for U.S. Appl. No. 13/105,069.
Notice of Allowance dated Apr. 14, 2017 for U.S. Appl. No. 14/083,553.
Non-Final Office Action dated Sep. 26, 2016 for U.S. Appl. No. 14/083,553.
Final Office Action dated Mar. 29, 2016 for U.S. Appl. No. 14/083,553.
Non-Final Office Action dated Oct. 26, 2015 for U.S. Appl. No. 14/083,553.

\* cited by examiner

MOBILE COMMUNICATION RADIO RECEIVER FOR PROCESSING SIGNALS FROM MULTIPLE NETWORKS

REFERENCE TO RELATED APPLICATION

This application is a continuation of U.S. application Ser. No. 14/083,553 filed on Nov. 19, 2013, which is a divisional of U.S. application Ser. No. 13/105,069 filed on May 11, 2011, the contents of which are incorporated by reference in their entirety.

FIELD

The invention relates to mobile communications, and more particularly to the technique of receiving and processing pagings from multiple networks.

BACKGROUND

A new feature for receivers in mobile communications is Dual-SIM-Dual-Standby (DSDS). It means the UE (user equipment) contains (at least) two SIM (subscriber identity module) cards and registers in (at least) two networks. If the UE is in an idle/standby state, it shall be able to receive pagings, i.e. notifications of incoming calls or messages, from both networks.

Another challenging feature for a Dual SIM (DS) phone is to receive a paging on one network during an active connection (e.g. call) on the other network. This feature will be referred to as Dual-SIM-Single-Transport (DSST) in the following.

A straight-forward approach to avoid missing of a paging on one network while being in a call on the other network (i.e. during a DSST scenario) is to add a second receive path to the UE. However, this means additional hardware, implying additional chip area and power consumption.

For these and other reasons there is a need for improvements in techniques for receiving and processing pagings from multiple networks.

BRIEF DESCRIPTION OF THE DRAWINGS

The accompanying drawings are included to provide a further understanding of embodiments and are incorporated in and constitute part of this specification. The drawings illustrate embodiments and together with the description serve to explain principles of embodiments. Other embodiments and many of the intended advantages of embodiments will be readily appreciated as they will become better understood by reference to the following detailed description. Like reference numerals designate corresponding similar parts.

DETAILED DESCRIPTION

In the following detailed description, reference is made to the accompanying drawings, which form a part thereof, and in which are shown by way of illustration specific embodiments in which the invention may be practiced. In the drawings, like reference numerals are generally utilized to refer to like elements throughout the description. In the following description, for purposes of explanation, numerous specific details are set forth in order to provide a thorough understanding of one or more aspects of embodiments of the invention. It may be evident, however, to one skilled in the art that one or more aspects of the embodiments of the invention may be practiced with a lesser degree of these specific details. In other instances, known structures and devices are shown in a simplified representation in order to facilitate describing one or more aspects of the embodiments of the invention. The following description is therefore not to be taken in a limiting sense, and the scope of the invention is defined by the appended claims.

The various aspects summarized may be embodied in various forms. The following description shows by way of illustration various combinations and configurations in which the aspects may be practiced. It is understood that the described aspects and/or embodiments are merely examples, and that other aspects and/or embodiments may be utilized and structural and functional modifications may be made without departing from the scope of the present disclosure. In particular, it is to be understood that the features of the various exemplary embodiments described herein may be combined with each other, unless specifically noted otherwise.

As employed in this specification, the terms "coupled" and/or "electrically coupled" are not meant to mean that the elements must be directly coupled together; intervening elements may be provided between the "coupled" or "electrically coupled" elements.

The mobile communications radio receiver described herein will be referred to as UE (user equipment) and may be employed in terminal devices of wireless communication systems, in particular in mobile phones or other mobile terminal devices.

Figure 1:
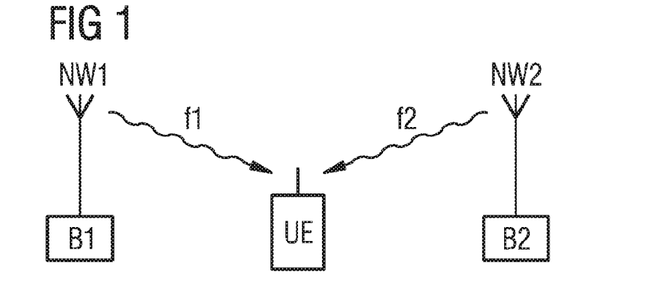
FIG. 1 is an illustration of a first multiple network scenario for a mobile communications radio receiver.

By way of example, FIG. 1 illustrates a first multiple network scenario for a mobile communications radio receiver (UE). The UE is configured to register in two networks NW1 and NW2. In this embodiment, the networks NW1 and NW2 are operated on different frequency bands f1 and f2. Thus, since the UE must be available to receive pagings from the NW1 operator and the NW2 operator, the UE must be able to tune to frequency bands f1 and f2. By way of example, as shown in FIG. 1, different base stations B1, B2 (i.e. different cells) may be used by the networks NW1 and NW2. However, it is also possible that networks NW1 and NW2 use shared base stations B1=B2 (i.e. the same cells).

Figure 2:
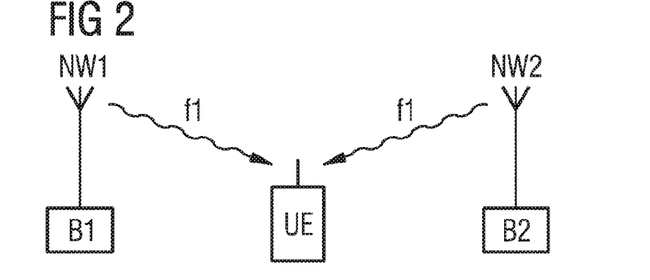
FIG. 2 is an illustration of a second multiple network scenario for a mobile communications radio receiver.

FIG. 2 illustrates a second multiple network scenario for an UE. The UE is configured to register in two networks NW1 and NW2. In contrast to the scenario illustrated in FIG. 1, the networks NW1 and NW2 are operated on the same frequency band f1. Thus, the UE is available to receive pagings from the NW1 operator and the NW2 operator if tuned to frequency band f1. By way of example, as shown in FIG. 2, different base stations B1, B2 (i.e. different cells) may be used by the networks NW1 and NW2. However, it is also possible that networks NW1 and NW2 use shared base stations B1=B2 (i.e. the same cells).

Throughout this description, the signals received from the first and second networks NW1, NW2 are different, i.e. they contain different information.

Figure 3:
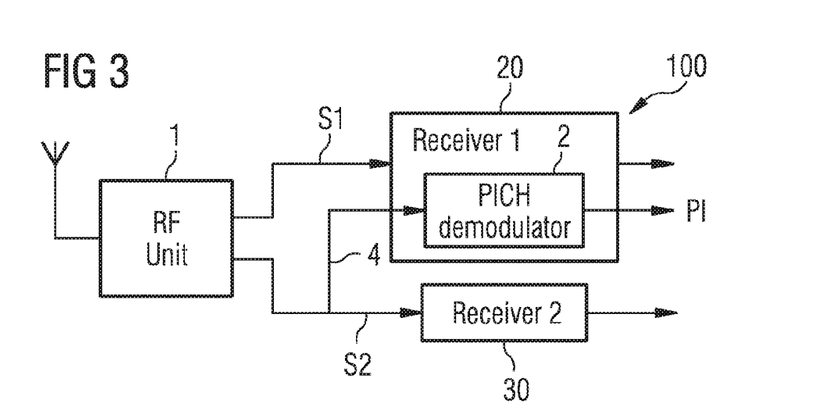
FIG. 3 is block diagram illustrating an embodiment of a mobile communications radio receiver.

FIG. 3 is a block diagram illustrating an embodiment of an UE 100. UE 100 comprises an RF unit 1, a first receiver 20 for demodulating a first down-converted signal S1 from a radio signal received from the first radio network NW1 and a second receiver 30 for demodulating a second down-converted signal S2 from a radio signal received from the second radio network NW2. The first receiver 20 comprises, inter alia, a paging indicator channel demodulator 2 which may be operated to demodulate a paging indicator channel (PICH) of the first radio network NW1 based on the first down-converted signal S1.

In this embodiment, the PICH demodulator 2 of the first receiver 20 is connected by a data connection 4 to signal S2 which contains the paging indicator channel signal of the second network NW2. This allows for resource sharing between the first and second receivers 20, 30. More specifically, during DSST, when there is an active connection established on network NW1, i.e. the first receiver 20 is active to demodulate e.g. speech data of a call on network NW1, the PICH resource of the first receiver 20 would be unused. In this situation, the signal which contains the paging indicator (PI) of the second network NW2 is routed via data connection 4 to the PICH demodulator 2 of the first receiver 20. Thus, a paging on the second network NW2 may be detected in the first receiver 20. Note that the second receiver 30 may be a reduced receiver such as, e.g., implemented in a Dual-Cell/Dual-Band HSUPA (High Speed Uplink Packet Access) receiver, which has no PICH demodulator.

Figure 4:
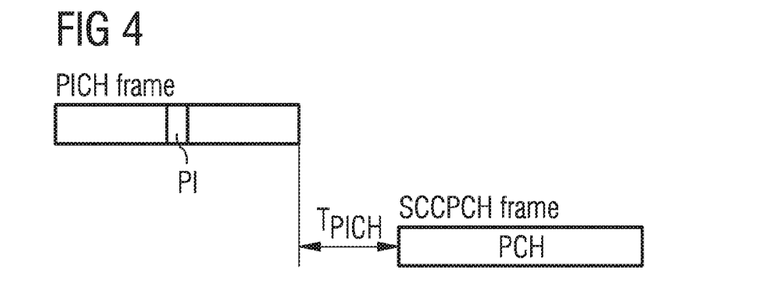
FIG. 4 is a diagram illustrating by way of example a possible structure of a paging indicator channel and a control channel associated therewith.

FIG. 4 is diagram illustrating by way of example a possible structure of a PICH and a control channel associated with the PICH and referred to as SCCPCH (Secondary Common Control Physical Channel). PICH and SCCPCH are used for pagings in general WCDMA systems.

The PICH is repeatedly transmitted over radio frames having a length of, e.g., 10 ms, i.e. the length of UMTS (Universal Mobile Telecommunications System) radio frames. The PICH is used to carry the PI. The PICH is always associated with an SCCPCH to which a PCH (Paging CHannel) is mapped. A PI set in a PICH frame means that a paging message is to be transmitted on the PCH in the SCCPCH frame. There is a time difference of $T_{PICH}$ between the PICH frame and the SCCPCH frame associated with the PICH frame. In other words, the SCCPCH frame is transmitted $T_{PICH}$ after the end of the PICH frame. The time gap $T_{PICH}$ between the PICH and SCCPCH frames may be between 2 ms (3 slots) and 20 ms (30 slots).

Figure 5:
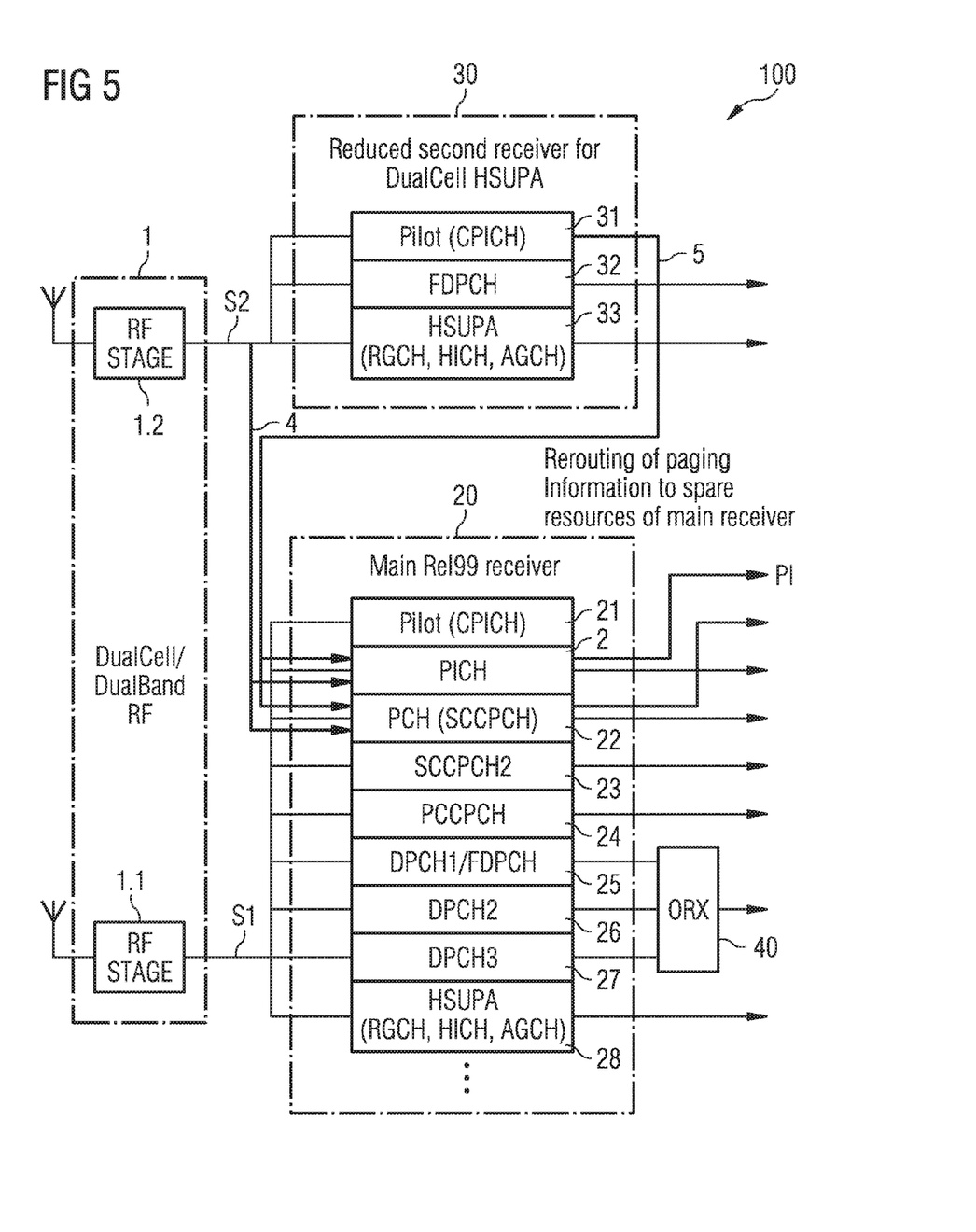
FIG. 5 is a block diagram illustrating an embodiment of a mobile communications radio receiver.

FIG. 5 illustrates a block diagram of one embodiment of UE 100. By way of example, the RF unit 1 may comprise two RF stages 1.1 and 1.2. The RF stages 1.1 and 1.2 may be tuned to different frequency bands. RF stage 1.1 comprises an RF down-converter and provides the first down-converted signal S1 from a radio signal received from network NW1 and RF stage 1.2 comprises an RF down-converter and provides the second down-converted signal S2 from a radio signal received from network NW2. Thus, different down-conversion frequencies may be concurrently used in the RF stages 1.1 and 1.2, respectively. The RF unit 1 may in particular be used in a dual cell/dual band environment using different frequency bands for transmissions of networks NW1 and NW2 as shown in FIG. 1.

FIG. 5 further illustrates a block diagram of the first and second receivers 20 and 30 contained in UE 100, respectively. As mentioned earlier in conjunction with FIG. 3, the UE 100 may contain a first or main receiver 20 and a second or reduced receiver 30. The main receiver 20, which may be an UMTS Re199 receiver, may comprise a number of demodulators, e.g. a CPICH (Common Pilot CHannel) demodulator 21 for pilot demodulation, a PCH(SCCPCH) demodulator 22 for PCH demodulation in case a PI is detected by the PICH demodulator 2, a second SCCPCH demodulator 23, a PCCPCH (Primary Common Control Physical CHannel) demodulator 24, a DPCH1/FDPCH (Dedicated Physical CHannel/Fractional Dedicated Physical CHannel) demodulator 25, two additional DPCH demodulators 26, 27 and a HSUPA (High Speed Uplink Packet Access) demodulator 28 for demodulating the corresponding RGCH (Relative Grant CHannel), HICH (Hybrid ARQ Indicator CHannel) and AGCH (Absolute Grant CHannel).

The reduced receiver 30 may contain a number of demodulators which are needed for Dual-Carrier HSUPA capability, namely a CPICH demodulator 31 for pilot demodulation, a FDPCH demodulator 32 and a HSUPA demodulator 33 for demodulating the corresponding RGCH, HICH and AGCH.

It is to be noted that in HSUPA uplink data is transmitted on two different carriers. Thus, to receive the corresponding (different) HSUPA control channels, an UE having HSUPA capability needs a second receiver. To limit semiconductor chip area and power consumption, the second receiver may be stripped down to the functions necessary for the demodulation of the HSUPA control channel on the second carrier. The reduced receiver 30 shown in FIG. 5 is such a second receiver configured for HSUPA control channel demodulation. Note that this reduced receiver 30 may not contain any DPCH demodulator, since on the second carrier no Re199 data downlink channel DPCH exists. Further, the reduced receiver 30 does not contain any PICH and/or PCH(SC- CPCH) demodulators for the receipt of pagings. This may also apply to the UE 100 illustrated in FIG. 3.

Further, the UE 100 in one embodiment may contain only one single main receiver 20 employing, e.g., demodulators 21 to 28 and only one single reduced receiver 30 employing, e.g., demodulators 31 to 33.

Similar to the illustration in FIG. 3, a data connection 4 is used to route signal S2, which contains the PICH and the SCCPCH on the second network NW2, to the main receiver 20, and, more specifically, e.g. to the inputs of the PICH demodulator 2 and the PCH(SCCPCH) demodulator 22. Again, since the main receiver 20 is operating a call on the first network NW1 (i.e. the DSST scenario is considered), the paging resources in the main receiver 20 are unused. More specifically, while the DPCH1/FDPCH demodulator 25 and the DPCH2 and DPCH3 demodulators 26, 27 in the main receiver 20 are used to demodulate the downlink speech data from network NW1, the PICH demodulator 2 and the PCH(SCCPCH) demodulator 22 are configured to demodulate in parallel to the DPCH1/FDPCH demodulator 25 and the DPCH2 and DPCH3 demodulators 26, 27 (i.e. parallel to an active call) the PICH and PCH(SCCPCH) frames on network NW2.

The second or reduced receiver 30 may comprise a channel estimator to generate channel estimates based on the second down-converted signal S2. Here, by way of example, the CPICH demodulator 31 may be used as a channel estimator. Thus, at an output of the CPICH demodulator 31, channel estimates indicative of the communication link over the second network NW2 are provided. These channel estimates are routed via data connection 5 to the first main receiver 20.

The channel estimates generated in the reduced receiver 30 and provided via data connection 5 may be input to the PICH demodulator 2 and the PCH(SCCPCH) demodulator 22 of the main receiver 20 in order to demodulate the PI and the SCCPCH on the second carrier (second network NW2). This is possible since these resources are unused during DSST in UE 100. When rerouting the paging information of the second network NW2 to the unused PICH and PCH (SCCPCH) demodulators 2, 22 in the main receiver 20, the outputs of these demodulators 2, 22 have to be interpreted by downstream paging decoder circuitry (not shown) to be indicative of pagings on the second network NW2 rather than pagings on the first network NW1.

As known in the art, the receivers 20, 30 are also referred to as inner receivers (IRX) and may, for instance, be implemented by a RAKE receiver. The outputs of the various demodulators 2, 21 to 28 and 31 to 33 are indicated by arrows and may be coupled to individual decoders. In FIG. 5, by way of example and for the sake of illustrative ease, only a channel decoder 40 for decoding the outputs of the DPCH1/FDPCH demodulator 25 and the DPCH2 and DPCH3 demodulators 26, 27 is shown. Such channel decoder 40 is also referred to as outer receiver (ORX) in the art. It is to be noted that the UE 100 may comprise a number of channel decoders (not shown) with each channel decoder being configured to decode a specific channel signal received from one channel demodulator 2, 21 to 28 of the main receiver 20 and from one channel demodulator 31 to 33 of the reduced receiver 30.

Figure 6:
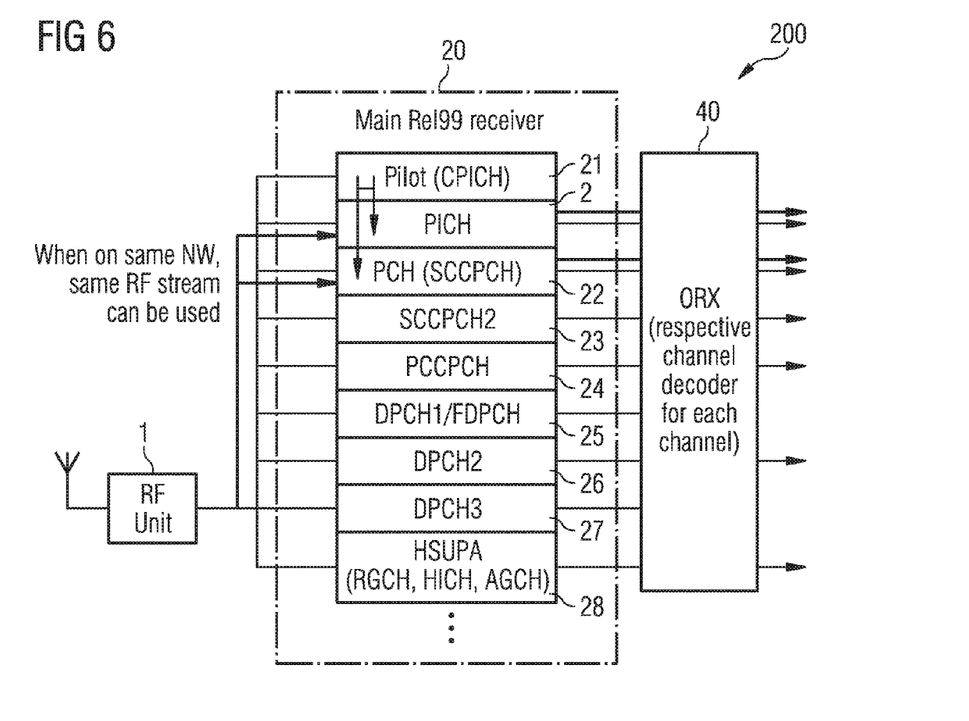
FIG. 6 is a block diagram illustrating an embodiment of a mobile communications radio receiver.

FIG. 6 illustrates a block diagram of one embodiment of UE 200. The UE 200 may comprise only one single RF unit 1, which can only be tuned to one frequency band. The RF unit 1 provides a down-converted signal which comprises signal S1 received from network NW1 and signal S2 received from network NW2. Thus, the same down-conversion frequency is used to generate signals S1 and S2. The UE 200 may in particular be used in a dual cell/single band environment using the same frequency band for transmissions of networks NW1 and NW2 as shown in FIG. 2.

Further, the UE 200 may in particular be used in a dual cell/single band environment operating in only one network NW1. In this case, two subscribers corresponding to the two SIM cards may use the UE 200 concurrently.

The UE 200 may comprise only a single receiver 20. Similar to the operation already explained with respect to FIGS. 3 and 5, during an active connection (e.g. call) on one SIM, the DPCH1/FDPCH demodulator 25 and the DPCH2 and DPCH3 demodulators 26, 27 in the receiver 20 are used to demodulate the downlink speech data for one SIM. During this activity, the PICH demodulator 2 and the PCH (SCCPCH) demodulator 22 are configured to demodulate in parallel to the DPCH1/FDPCH demodulator 25 and the DPCH2 and DPCH3 demodulators 26, 27 (i.e. parallel to an active call) any pagings received on PICH and SCCPCH for the other SIM (i.e. the other subscriber). Since on the same network the CPICH is valid for both subscribers, a second (reduced) receiver 30 is not needed. In FIG. 6, the vertical arrows indicate channel estimates generated in the CPICH demodulator 21 to be used for demodulating pagings in the PICH demodulator 2 and the PCH(SCCPCH) demodulator 22.

Figure 7:
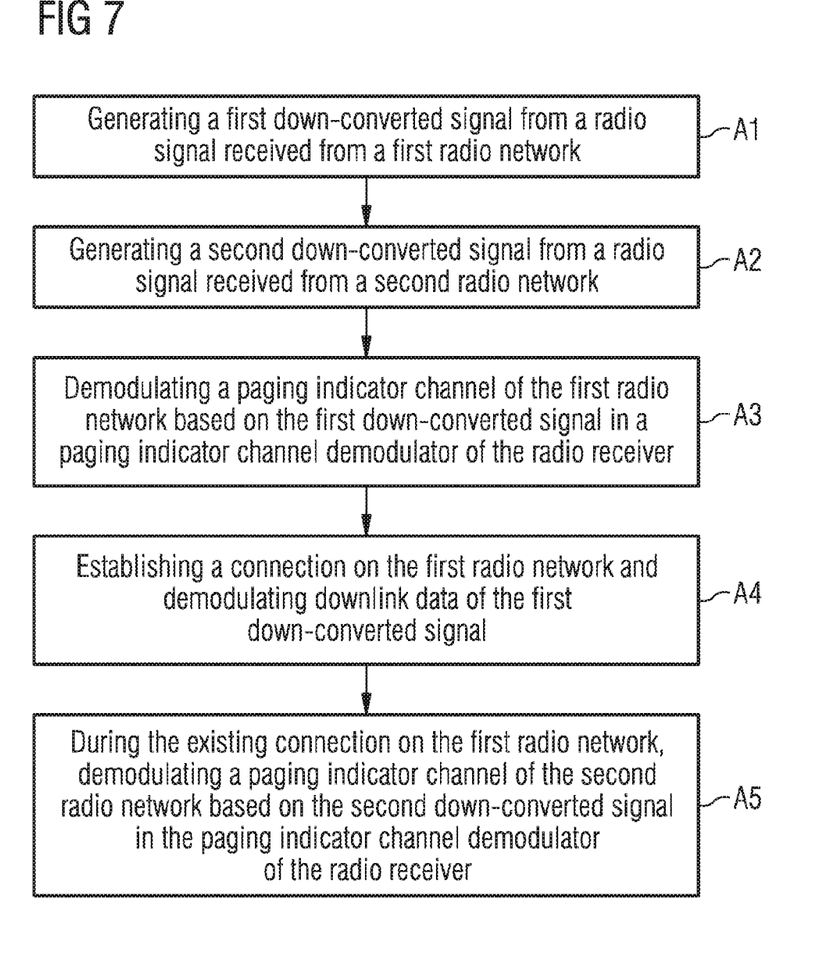
FIG. 7 is a flowchart of an embodiment of a method of listening to pagings transmitted by a second network while having a connection established with a first network.

FIG. 7 is a flowchart of an embodiment of a method of listening to pagings transmitted by the second network NW2. This method may be performed by UE 100 or 200 as shown in FIGS. 3, 5 and 6.

As already described above, a first down-converted signal S1 from a radio signal received from a first radio network NW1 and a second down-converted signal S2 from a radio signal received from a second radio network NW2 are generated at A1 and A2, respectively. For instance, as shown in FIG. 5, RF stages 1.1 and 1.2 may be used to generate S1 and S2, respectively.

When there is no active data connection established with the first network NW1, the paging indicator channel of the first network NW1 based on the first down-converted signal S1 is demodulated in the PICH demodulator 2 of the main radio receiver 20 at A3. Further, the PCH(SCCPCH) demodulator 22 is used to demodulate the corresponding control channel SCCPCH of the first network NW1.

When the first network NW1 is signaling via PICH and SCCPCH that a connection is to be established, the DPCH1/FDPCH demodulator 25 and the DPCH2 and DPCH3 demodulators 26, 27 are activated to demodulate downlink message data such as e.g. speech data. Thus, a connection on the first radio network NW1 is established at A4. Then, while having an existing connection established on the first radio network NW1, a PICH and a SCCPCH of the second radio network NW2 based on the second down-converted signal is demodulated at A5 in the same PICH demodulator 2 and the same PCH(SCCPCH) demodulator 22 as has been used before to demodulate the corresponding PICH and SCCPCH of the first network NW1. This is accomplished by replacing the signal S1 by the signal S2 at the inputs of the PICH demodulator 2 and the PCH(SCCPCH) demodulator 22, i.e. by rerouting the signal S2 to the main receiver 20.

Figure 8:
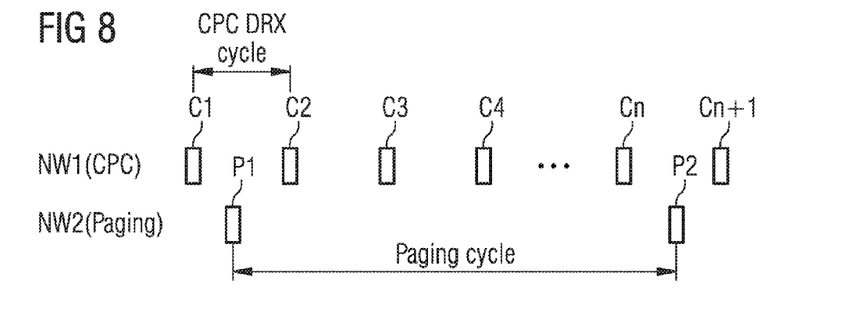
FIG. 8 is a timing diagram illustrating a first scenario of continuous packet connectivity on a first network and paging on a second network.
Figure 9:
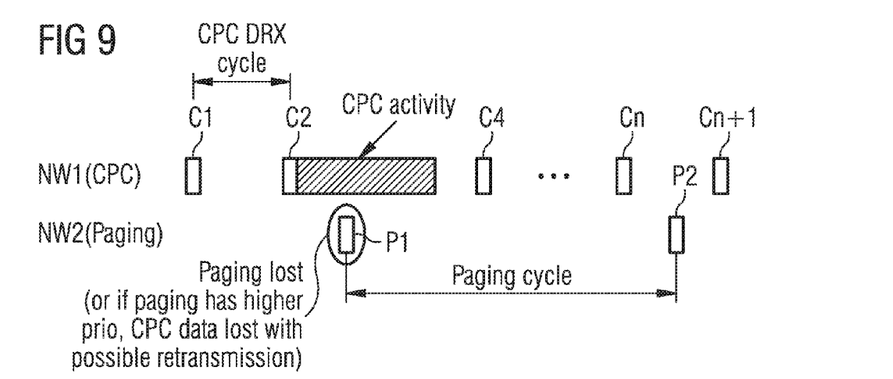
FIG. 9 is a timing diagram illustrating a second scenario of continuous packet connectivity on a first network and paging on a second network.
Figure 10:
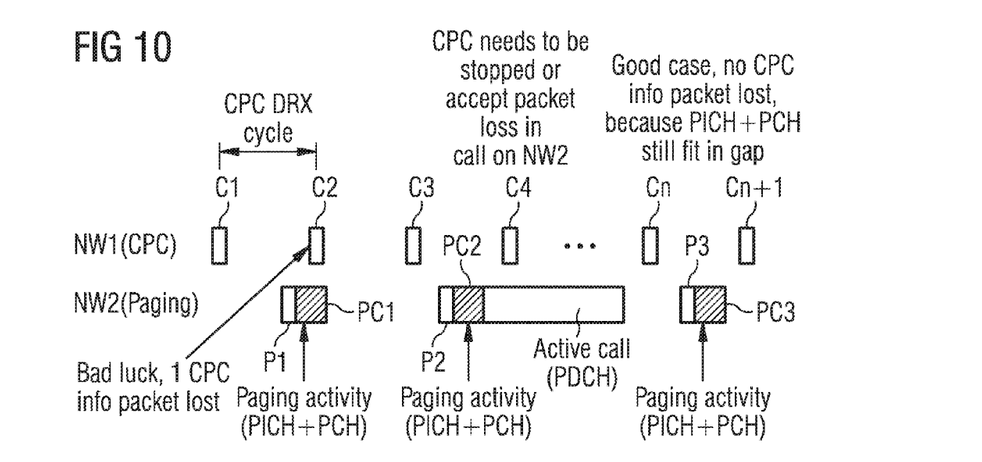
FIG. 10 is a timing diagram illustrating a third scenario of continuous packet connectivity on a first network and paging on a second network.

According to another aspect, discontinuous reception (DRX) cycles of continuous packet connectivity (CPC) on the first network NW1 are used to receive pagings from the second network NW2. FIGS. 8 to 10 are timing diagrams illustrating various scenarios of CPC on the first network NW1 and paging on the second network NW2.

With CPC an UE can have an active connection to the first network NW1, but if no data is sent the UE only checks in certain intervals if data is available. In between these checks the UE can be turned off to save power. The intervals between the checks are referred to as CPC DRX cycles.

FIG. 8 illustrates the timing of a CPC connection between the first network NW1 and an UE. The time spans during which the UE checks whether data is available on the first network NW1 are indicated by C1, C2, C3, ..., Cn, Cn+1.

Since the demodulator of the UE is turned off during the CPC DRX cycles between C1, C2, C3, ..., Cn, Cn+1, it can be turned on during these periods in order to listen to pagings on the second network NW2. In one embodiment, if the second network NW2 is operated on a different frequency band f2 than the frequency band f1 used by the first network NW1, see FIG. 1, the UE has to be tuned to the second frequency band f2 upon activation during the CPC DRX cycles. In another embodiment, if the first and second networks NW1 and NW2 operate on the same frequency band f1, see FIG. 2, the UE must not be tuned to another frequency band when activated during the CPC DRX cycles of the first network NW1 to listen to pagings on the second network NW2.

FIG. 8 illustrates the case where there is a CPC connection but no activity (beyond the CPC DRX cycles) on the first network NW1 and there are no pagings on the second network NW2. The paging instances on the second network NW2, i.e. the times when the PI in the PICH frames may occur, are indicated by P1, P2, .... Here, the paging instances of the second network NW2 fit into the CPC DRX cycles of the first network NW1 (which operates on an existing but idle CPC connection with the UE). Therefore, the occurrence of a PI at a paging instance in the second network NW2 would be detectable. Note that the paging cycle on the second network NW2 is defined by the time interval between consecutive paging instances P1, P2, .... The duration of the paging cycle may be e.g. between 80 and 5120 ms.

It is to be noted that the paging cycle may be considerably longer than the CPC DRX cycle. Thus, as illustrated in FIG. 8, it may not be necessary to re-activate the UE during each CPC DRX cycle in order to listen to pagings on the second network NW2. Rather, since the length of the paging cycle of network NW2 is known in the UE, it may be sufficient to activate the UE only during specific CPC DRX cycles, e.g. during the cycle between C1 and C2 and the cycle between Cn and Cn+1, see FIG. 8.

If the paging instances P1, P2 of the second network NW2 overlap with short activities on the first network NW1 within a CPC DRX cycle to check for data, at least in the scenario of FIG. 1 (different frequency bands f1, f2), an UE having one RF unit 1 can not listen anymore to pagings P1, P2 on the second network NW2. This situation is illustrated in FIG. 9. FIG. 9 illustrates CPC activity on the first network NW1 concurrently with the timing of the paging instance P1 on the second network NW2.

In this case there are two options: The first option is that paging P1 is lost because of the ongoing CPC activity on the first network NW1. Since pagings are typically repeated several times (e.g., a paging at paging instance P1 is repeated after a delay of one paging cycle at paging instance P2), there is a high probability to receive at least one of the repetitions. For instance, as illustrated in FIG. 9, the repetition of paging P1 at paging instance P2 would be received because there is no simultaneous CPC activity in the CPC DRX cycle between Cn and Cn+1. The user probably would not notice the short delay.

The second option is to prioritize the listening to pagings on the second network NW2 over the short DRX CPC activities on the first network NW1. In this case the paging P1 would be received, whereas the CPC activity on the first network NW1 would be missed. However, missing one activity instance in CPC would not drop the CPC DRX connection on the first network NW1. It probably means only a short delay in the start of a possible data transfer on the first network NW1.

Thus, depending on the priority settings, either CPC activity on the first network NW1 or listening to pagings on the second network NW2 may be prioritized, and in both cases both operations could be performed (even though the non-prioritized operation may be delayed for a specific time such as one or more CPC DRX cycles or one or more paging cycles, respectively). The priority setting (DRX CPC or paging prioritized) may be adapted on the basis of the settings of the two networks NW1, NW2. By way of example, the priority setting may depend on the length of the paging cycle, the number of repetitions of pagings and/or the length of the CPC DRX cycle.

FIG. 10 illustrates a case of paging on the second network NW2 and no activity (beyond the CPC DRX cycles) on the first network NW1. Here, the PICH frame is assumed to contain a paging indicator (PI) at the paging instance P1. Therefore, as explained in conjunction with FIG. 4, the PCH is to be demodulated in the associated SCCPCH frame. In FIG. 10 the PCH is indicated by reference signs PC1, PC2, PC3.

By way of example, C2 may occur concurrently with PC1. In this case one CPC info packet, namely the packet which would be received during C2, is lost if paging on the second network NW2 is prioritized over the CPC DRX connection on the first network NW1. This is illustrated in the left side portion of FIG. 10.

On detecting a paging on the second network NW2, an active call on the second network NW2 may be set up. In this case there are two options: The first option is to stop the CPC DRX connection on the first network NW1. In this case the CPC DRX connection is terminated. Another option is to maintain the CPC DRX connection on the first network NW1 and to accept packet loss in the call on the second network NW2. Since lost packets can also occur in an uninterrupted connection, the user would not notice the packet loss on the second network NW2 due to the continuation of the CPC DRX connection on the first network NW1. This situation of conflicting CPC DRX connection on the first network NW1 and an active call on the second network NW1 is depicted in the middle portion if FIG. 10 with reference to C3, C4 and P2, PC2, respectively.

As further shown in FIG. 10, it is also possible that the paging instance P3 (PICH frame) and the corresponding PCH (referred to as PC3) on the SCCPCH frame fit into the CPC DRX cycle gap. In this case, each paging (PICH and PCH) can be received on the second network NW2, and no CPC DRX info packet is lost during demodulation of the pagings.

In one embodiment, not shown in FIG. 10, there is an active continuous data transfer connection on the first network NW1. In this case it would typically not be possible to listen anymore to the paging on the second network NW2, because there are no CPC DRX cycles any more. However, even in this case, depending on the setting of the number of repetitions of data packets on the first network NW1 if a data packet is lost, it might even be possible to shortly interrupt the data transfer on the first network NW1 through higher layers (TCP/IP ...) and listing instead to possible pagings on the second network NW2. Listening to a paging indicator (PI) on the second network NW2 requires only a few slots (see FIG. 4) and much less than an UMTS frame. Therefore, even in this case of a continuous data connection on the first network NW1, it might be possible to shortly listen to the second network NW2 during the PI instances P1, P2, . . . because the lost data packets on the first network NW1 will probably be repeated. Thus, the user would not notice the loss of packets on the first network NW1 connection. Even for a long ongoing data transfer on the first network NW1, the packet dropping due to listening for pagings on the second network NW2 will only result in a slightly lower throughput on the first network NW1, which will not be noticed by the user.

Figure 11:
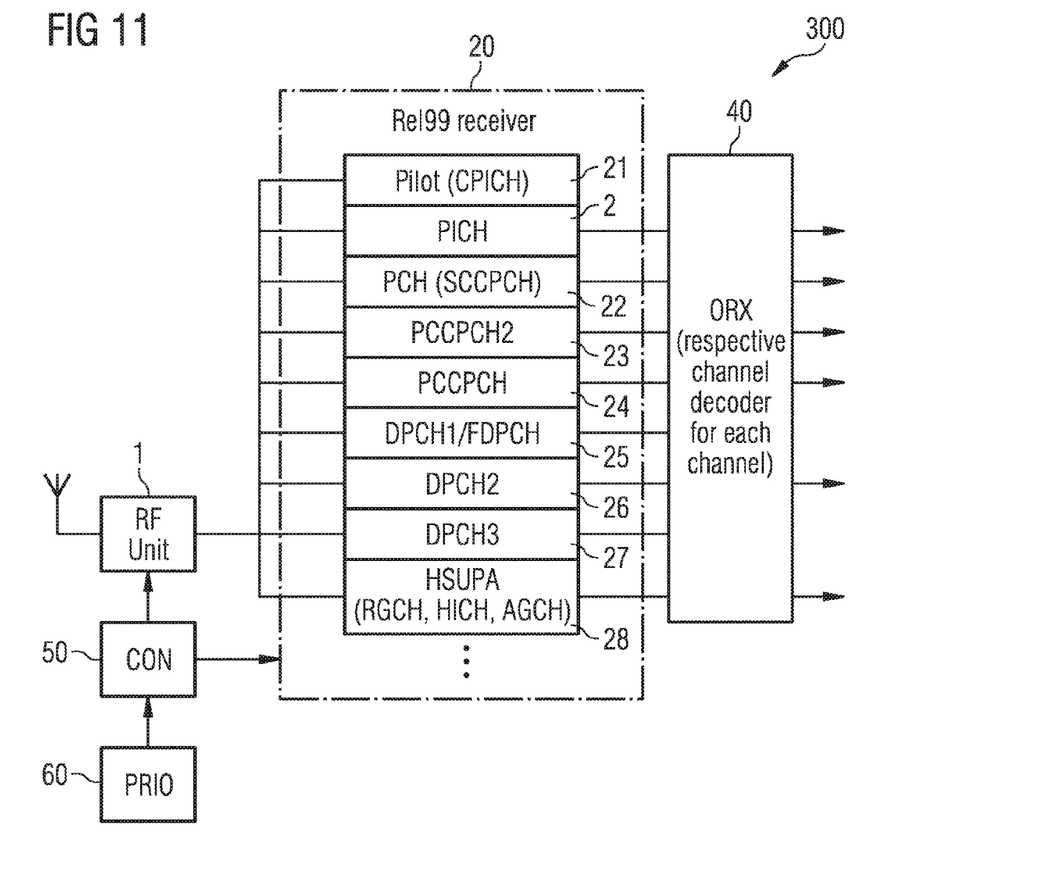
FIG. 11 is a block diagram illustrating an embodiment of a mobile communications radio receiver.

FIG. 11 illustrates an embodiment of an UE 300 configured to be operated using one or more of the methods described above with reference to FIGS. 8 to 10. This UE 300 may comprise one single receiver 20 which may be similar to the main receiver 20 shown in FIG. 5. More specifically, the receiver 20, which may be a UMTS Re199 receiver, may comprise a CPICH demodulator 21 for pilot demodulation, a PCH(SCCPCH) demodulator 22 for PCH demodulation, a second SCCPCH demodulator 23, a PCCPCH demodulator 24, a DPCH1/FDPCH demodulator 25, two additional DPCH demodulators 26, 27 and a HSUPA demodulator 28. The outputs of the various demodulators 2, 21 to 28 are provided to a channel decoder 40 (ORX). The channel decoder 40 may contain for each channel a respective channel decoder to decode the specific channel signal received from one channel demodulator 2, 21 to 28 of the receiver 20.

The UE 300 may comprise a single-band RF unit 1, which can be tuned to the frequency bands f1 and f2 in a sequential manner, but which can not down-convert the frequency bands f1 and f2 concurrently. The single-band RF unit 1 may be controlled by a control unit 50. The control unit 50 is configured to switch the single-band RF unit 1 to either generate the first down-converted signal S1 from the first network NW1 or to generate the second down-converted signal S2 from the second network NW2. The main receiver 20 is informed by the control unit 50 on this selection. A priority setting in case of conflicting CPC DRX activity on network NW1 and paging on network NW2 may be selected by a priority selection unit 60 in accordance with the description above.

Figure 12:
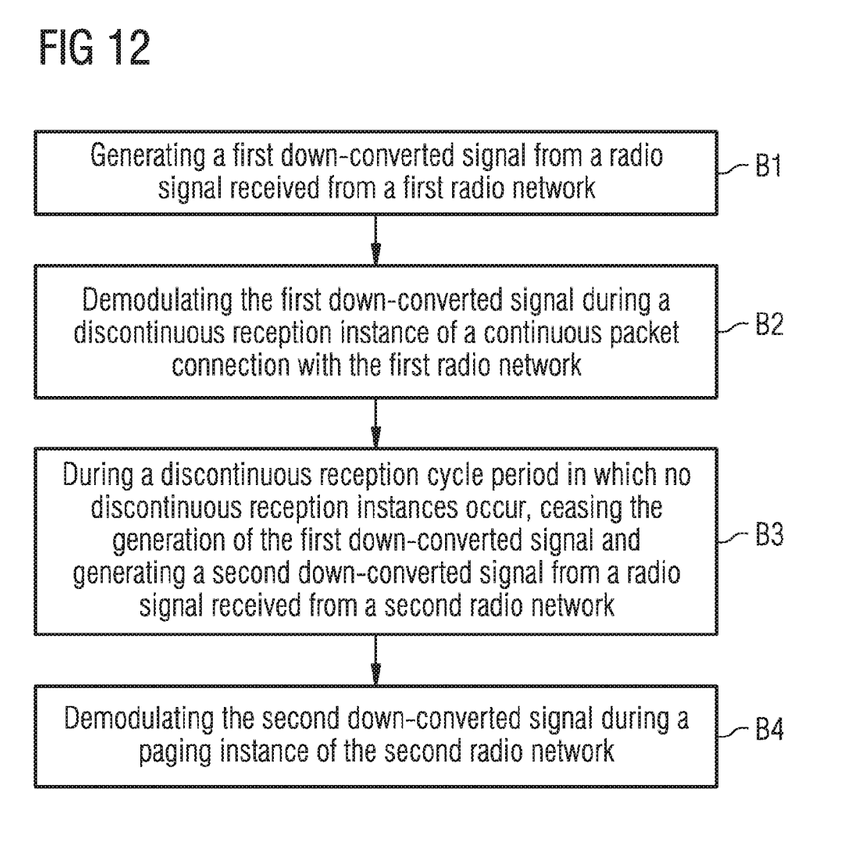
FIG. 12 is a flowchart of an embodiment of a method of listening to pagings transmitted by a second network while having a DRX continuous packet connection established with a first network.

According to FIG. 12, the UE 300 may operate as follows: A first down-converted signal S1 from a radio signal received from a first network NW1 is generated at B1. This first down-converted signal S1 is demodulated during a discontinuous reception instance of a CPC DRX connection with the first radio network NW1 at B2. During a DRX cycle period in which no DRX instances occur, the generation of the first down-converted signal S1 is stopped and the second down-converted signal S2 from a radio signal received from the second network NW2 is generated at B3. The second down-converted signal S2 is demodulated during a paging instance on the second network NW2 at B4. The control of the RF unit 1 and the receiver 20 in accordance with the above description is accomplished by the control unit 50.

Figure 13:
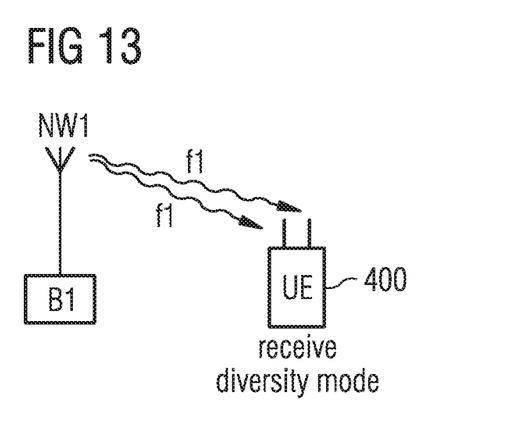
FIG. 13 is an illustration of a receive diversity mobile communications radio receiver receiving a signal from a first network.
Figure 14:
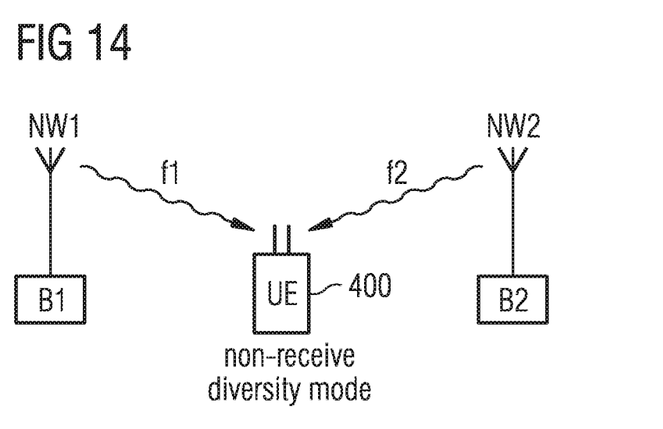
FIG. 14 is an illustration of a receive diversity mobile communications radio receiver operating in a single receiver mode on the first network and in a paging mode on a second network.

According to another aspect, receive diversity operation of an UE 400 on the first network NW1 may be exploited to receive pagings from the second network NW2. FIGS. 13 and 14 are explanatory illustrations of this concept.

FIG. 13 illustrates an UE 400 operating in a receive diversity mode on a single network NW1. In case of a receive diversity connection the UE 400 has (at least) two antennas for receiving a first and a second radio signal from the first network NW1. As each antenna is coupled to a separate receiver chain in the UE 400, a receive diversity connection occupies two receiver chains in UE 400. In other words, the two receiver chains are tuned to the same frequency f1 and demodulate signals from two different antennas containing the same information. The signals, however, are different because they arrive at the UE 400 via different propagation paths.

In order to receive pagings from the second network NW2, the UE 400 may be configured to switch the receive diversity operation (FIG. 13) on the first network NW1 to a single receiver chain reception for the duration of the paging occurrence on the second network NW2. This releases the second receiver chain, which may then be used to demodulate a paging indicator channel of the second network NW2. This is shown by way of example in FIG. 14. Here the receive diversity operation on the first network NW1 is interrupted and the connection on the first network NW1 is continued in a single receive antenna mode, in which only one receiver chain is needed to demodulate the radio signal (e.g. speech signal) transmitted by the first network NW1. Concurrently, the second receiver chain is tuned to frequency f2 of the second network NW2. The second receive antenna and the receiver chain associated with the second antenna are then used to receive and demodulate pagings on the second network NW2.

As explained above with reference to other embodiments, the switching from receive diversity operation to single antenna operation and back to receive diversity operation requires only a few slots, because the timing of the PI on the PICH of the second network NW2 is known in the UE 400. Therefore, although the receiver capability and the demodulation performance on the first network NW1 are reduced for a short period of time, the user may probably not notice this degradation. On the other hand, he may securely receive pagings on the second network NW2.

Figure 15:
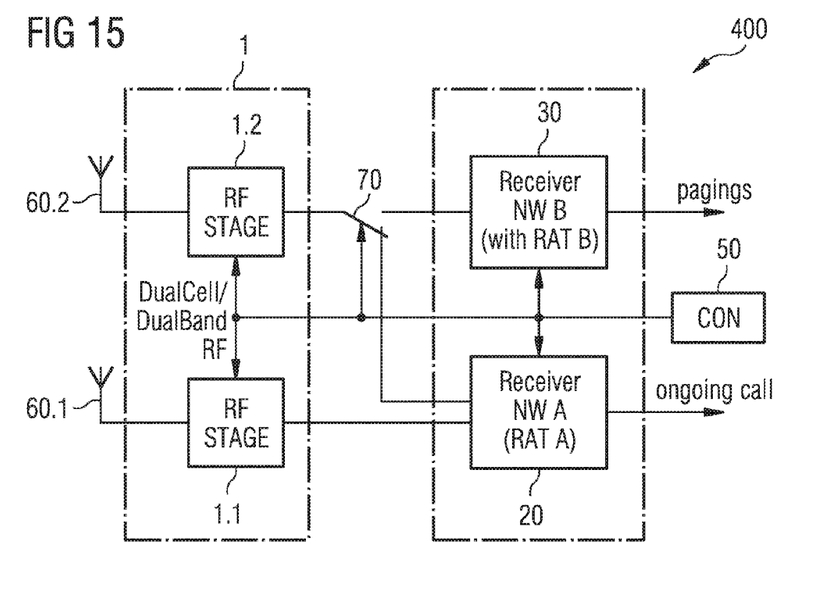
FIG. 15 is a block diagram illustrating an embodiment of a receive diversity mobile communications radio receiver.

FIG. 15 is a block diagram of an embodiment of an UE 400 configured to operate in accordance with the description of FIGS. 13 and 14. The UE 400 may comprise two antennas 60.1 and 60.2. The first antenna 60.1 is coupled to an input of a first RF stage 1.1 of an RF unit 1, and the second antenna 60.2 is coupled to an input of a second RF stage 1.2 thereof. The UE 400 further comprises two receiver units 20, 30. Further, the UE 400 may comprise a switch 70 with an input thereof being coupled to an output of the second RF stage 1.2. A first output of switch 70 may be coupled to an input of the first receiver unit 20 and a second output of the switch may be coupled to an input of the second receiver unit 30. The first receiver unit 20 is configured to demodulate and decode two antenna signals during receive diversity operation. The first and second RF stages 1.1, 1.2, the first and second receiver units 20, 30 and the switch 70 are controlled by a control unit 50.

During receive diversity operation on the first network NW1 (see FIG. 13), the switch 70 is controlled by the control unit 50 to couple the output of the second RF stage 1.2 to an input of the first receiver unit 20. Thus, during e.g. an ongoing call on the first network NW1, both antenna signals S1 and S2 are demodulated in the first receiver unit 20. At paging instance P1, i.e. the time where a PI may occur on the PICH of the second network NW2, the control unit 50 tunes the second RF stage 1.2 to frequency f2 and operates the switch 70 to couple the output of the second RF stage 1.2 to an input of the second receiver unit 30. Further, the control unit 50 controls the second receiver unit 30 to demodulate and decode the PICH and, if a PI is detected on PICH, the corresponding SCCPCH frame on the second network NW2. Thus, the first down-converted signal S1 associated with the first antenna 60.1 and containing information of e.g. the ongoing call (or another data connection) on the first network NW1 is demodulated in a non-receive diversity mode in the first receiver unit 20, and the second down-converted signal S2 associated with the second antenna 60.2 and now containing the PICH of the second network NW2 is concurrently demodulated by the second receiver unit 30. If no PI is detected at the paging instance, the control unit 50 controls the RF stage 1.2, the switch 70 and the first receiver unit 20 to re-tune to the frequency band f1, to route the output of the second RF stage 1.2 to the first receiver unit 20 and to re-demodulate the downlink channel on the first network NW1 in the receive diversity mode, respectively. In other words, the second receiver chain (RF stage 1.2 and second receiver unit 30) is released and normal receive diversity operation as shown in FIG. 13 is resumed.

Thus, the control unit 50 may be configured to control the first and second RF stages 1.1, 1.2 to generate the first down-converted signal S1 from the radio signal received at the first antenna 60.1 by using a first down-conversion frequency and to generate the second down-converted signal S2 from the radio signal received at the second antenna 60.2 by using a second down-conversion frequency. In the receive diversity mode, the first and second down-conversion frequencies are equal. In the non-receive diversity mode, the first and second down-conversion frequencies are different.

Figure 16:
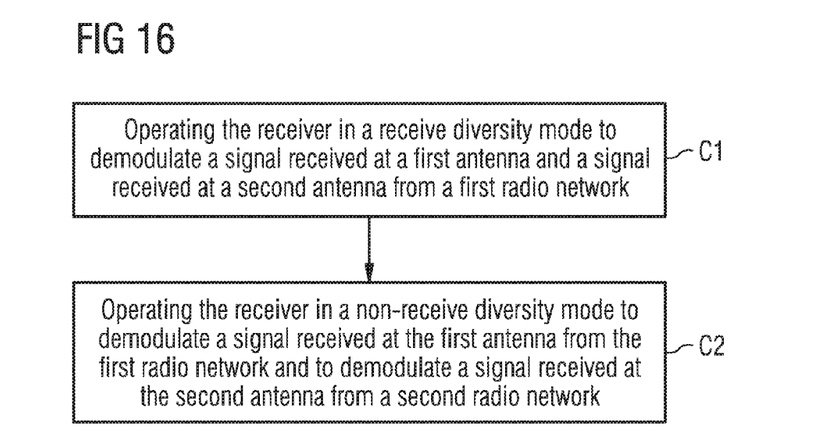
FIG. 16 is a flowchart of an embodiment of a method of listening to pagings transmitted on a second network while operating in a single receiver mode on the first network.

According to FIG. 16, the UE 400 may operate as follows: First, at C1, the UE 400 may be operated in a receive diversity mode to demodulate a signal received at the first antenna 60.1 and a signal received at the second antenna 60.2. Both signals are from the first radio network NW1 and contain the same information, e.g. speech information. Then, at C2, the UE 400 may be operated in a non-receive diversity mode to still demodulate the signal received at the first antenna 60.1 from the first network NW1 and to demodulate a signal received at the second antenna 60.2 from the second network NW2. This signal received at the second antenna 60.2 from the second network NW2 contains different information than the signal received at the first antenna 60.1 from the first network NW1. When operated in the non-receive diversity mode, the second receiver unit 30 may demodulate a paging indicator channel of the second network NW2 from the signal received at the second antenna 60.2.

It is to be noted that the reception of speech or data and parallel paging reading as described above in all embodiments can be done in any RAT (Radio Access Technology) receivers. By way of example, in case of a 3G and 2G connection, each receiver chain may receive separately the corresponding 2G and 3G paging information. Thus, the first network NW1 and/or the second network NW2 may each be a 2G network, a 3G network or e.g. a LTE network, and any combinations of such different networks are feasible.

The methods, aspects and embodiments described herein all relate to DSST scenarios, where one connection to a subscriber (e.g. of a first network NW1) is established while listening to pagings for another subscriber (e.g. of a second network NW2). Further, also a combination and interaction with other types of Dual-SIM capabilities, for instance DSDS (Dual-SIM-Dual-Standby), where both receiver chains are in a standby mode (i.e. with no active connection on any one of the networks NW1, NW2), or DSDT (Dual-SIM-Dual-Transport), where both receiver chains process an active connection to a first and second network NW1 and NW2, respectively, are possible. Further, the methods, aspects and embodiments described herein can be extended to three or more networks and/or they can be combined.

Further, it is to be noted that in all aspects and embodiments described herein, the UEs 100 to 400 may be configured for using HSDPH and HSUPA.

In addition, while a particular feature or aspect of an embodiment of the invention may have been disclosed with respect to only one of several implementations, such feature or aspect may be combined with one or more other features or aspects of the other implementations as may be desired and advantageous for any given or particular application. This application is intended to cover any adaptations or variations of the specific embodiments discussed herein, and the invention is intended to be limited only by the claims and the equivalence thereof.

The invention claimed is:

1. A wireless communication circuit in a Dual-SIM-Dual-Active mobile communication device, comprising:
 a first radio frequency (RF) receive circuitry associated with a first subscriber identification module (SIM) and a first network;
 a second RF receive circuitry associated with a second SIM and a second network;
 a control circuit configured to control the second RF receive circuitry to switch between a non-receive diversity mode and a receive diversity mode, wherein via the receive diversity mode the second RF receive circuitry is configured to demodulate first signal from the first network and to demodulate a second signal from the second network,
 wherein the demodulation of the first signal from the first network by the second RF receive circuitry and the demodulation of the second signal from the second network by the second RF receive circuitry are simultaneous or concurrent with one another.

2. The wireless communication circuit of claim 1, wherein the control circuit is configured to control the second RF receive circuitry in the receive diversity mode to receive signals from the first network in response to receipt of a first request.

3. The wireless communication circuit of claim 2, wherein the first request is a request to utilize the first RF receive circuitry and the second RF receive circuitry in a receive diversity mode.

4. The wireless communication circuit of claim 1, wherein the first RF receive circuitry is configured to receive the signals from the first network at a first antenna port configured to couple to a first antenna.

5. The wireless communication circuit of claim 1, wherein the second RF receive circuitry is configured to receive signals from the first network or the second network at a second antenna port configured to couple to a second antenna.

6. The wireless communication circuit of claim 2, wherein the control circuit is further configured to control the second RF receive circuitry to receive signals from the second network in the non-receive diversity mode.

7. The wireless communication circuit of claim 6, wherein the control circuit is configured to control the second RF receive circuitry to receive signals from the second network in the non-receive diversity mode in response to receipt of a second request, different than the first request.

8. The wireless communication circuit of claim 7, wherein the second request is a request to utilize the first RF receive circuitry and the second RF receive circuitry in the non-receive diversity mode.

9. The wireless communication circuit of claim 1, wherein the first RF receive circuitry comprises a first RF front end configured to receive first signals from the first network.

10. The wireless communication circuit of claim 9, wherein the first RF receive circuitry further comprises a first baseband processing circuitry configured to process the first signals from the first RF front end.

11. The wireless communication circuit of claim 10, wherein the processing performed by the first baseband processing circuitry comprises demodulation.

12. The wireless communication circuit of claim 10, wherein the second RF receive circuitry comprises a second RF front end configured to receive the signals from the first network in the receive diversity mode and receive the signals from the second network in the non-receive diversity mode in response to a request from the control circuit.

13. The wireless communication circuit of claim 12, further comprising a switch configured to route signals from the first network to the first baseband processing circuitry in the receive diversity mode, and route signals from the second network to second baseband processing circuitry in the non-receive diversity mode in response to a switch request from the control circuit.

14. The wireless communication circuit of claim 1, wherein, in the receive diversity mode, the control circuit is configured to:
   at a predetermined time period associated with a paging instance of the second network, control the second RF receive circuitry in the non-receive diversity mode to receive signals from the second network;
   maintain the second RF receive circuitry in the non-receive diversity mode if a paging indicator is detected by the second RF receive circuitry during the predetermined time data from the second network while processing the paging signal from the first network.

15. The wireless communication circuit of claim 1, wherein in the receive diversity mode a second RF receive circuitry processes speech data from the second network while processing the paging signal from the first network.

16. The wireless communication circuit of claim 1, wherein in the receive diversity mode a paging channel demodulator in the second RF receive circuitry demodulates a paging signal from the first network.

17. The wireless communication circuit of claim 16, wherein in the receive diversity mode a first demodulator in the second RF receive circuitry, different from the paging channel demodulator, processes speech data from the second network while the paging channel demodulator in the second RF receive circuitry demodulates a paging signal from the first network.

18. The wireless communication circuit of claim 1, wherein a first frequency band on which the first network transmits is different from a second frequency band on which the second network transmits such that the first signal has a first frequency in the first frequency band and the second signal has a second frequency in the second frequency band.

* * * * *